July 9, 1946. E. C. MEAD 2,403,673
LUMBER FEEDING CONVEYER FOR SAW TRIMMERS
Filed March 17, 1944
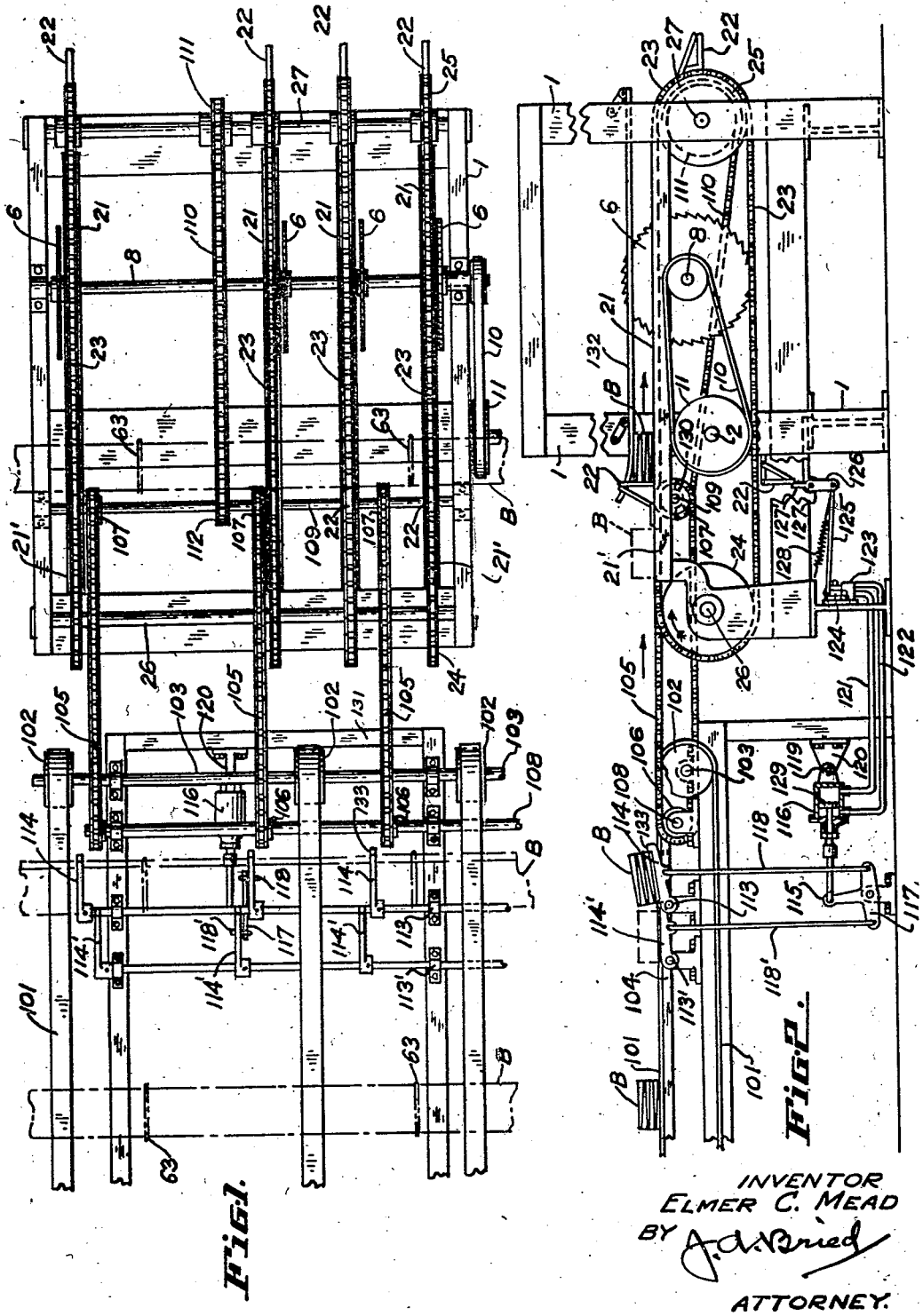
INVENTOR
ELMER C. MEAD
BY
ATTORNEY.

Patented July 9, 1946

2,403,673

UNITED STATES PATENT OFFICE 2,403,673

LUMBER FEEDING CONVEYER FOR SAW TRIMMERS

Elmer C. Mead, Scotia, Calif., assignor to The Pacific Lumber Company, San Francisco, Calif., a corporation of Maine Application March 17, 1944, Serial No. 526,922

4 Claims. (Cl. 198—34)

This invention relates to lumber feeding conveyers and has for its principal object improvements in such conveyers especially adapted for feeding of boards to a gang-saw trimmer for cutting off the boards to standard lengths. The improvement including means for straightening or aligning the boards or bundles of boards at right angles to the direction of travel of the conveyer and definitely spacing the boards or bundles with respect to the requirements of the saw trimmer.

Specific features and advantages of the construction will appear in the following description and accompanying drawing.

In the drawing:

Fig. 1 is a plan view of a portion of the conveyer and trimmer.

Fig. 2 is a side elevation of my lumber feeding conveyer shown in operative relation to a gangsaw trimmer.

Before describing the drawing in detail it should be stated that my improved lumber feeding conveyer is shown feeding bundles of boards to an automatic length selecting cut off saw as shown in my joint Patent No. 2,332,654 of October 26, 1943, and therefore the few elements of the sawing machine shown in the present drawing are numbered to correspond with the same elements as shown in said patent for easy identification, as the whole saw machine is not shown herein, but only as much as is necessary to show its cooperative relation to the special lumber feeding conveyer and tripping arrangement constituting the present invention.

In the patent and in the present drawing the automatic length selecting cut off saw machine comprises a frame 1 with a series of horizontally disposed lumber supporting rails or guides 21 along which guides bundles of lumber B extending transversely of the rails, are moved by the pusher lugs 22 of a series of endless traveling chains 23, past a series of spaced circular saws 6. These saws are normally depressed below the bundles of lumber, and by reason of certain trips operated by one end of the bundle one saw only rises to trim off that end of the bundle to make the boards in that particular bundle all of a standard length. The series of endless chains 23 are supported over suitable wheels or sprockets 24 and 25 mounted on shafts 26, 27 and all driven in unison by shaft 27, all as described in said patent.

While the drawing shows the saw machine as operating on bundles of boards which are tied together with ropes or wires 63 at spaced points along their length, it will of course operate with single boards in the same way, the pre-bundling of the boards made up of boards of about the same length with their ends substantially aligned at one end of the bundle only as explained in the patent, is done to greatly increase the output of the sawing machine.

In the sawing machine of the patent the boards or bundles of boards had to be placed upon the laterally extending portions 21' of the guides by hand, whereas in the present improvement conveyer means is provided for doing this and also insuring that the boards or bundles of boards are suitably spaced and straightened up to lie at right angles across the guides 21' when they reach them and in proper position so that when the next pusher lugs 22 of the sawing machine come along, they will all properly engage the bundle.

The improvement comprises providing a series of laterally spaced conveyer bands 101 which pass over head pulleys 102 supported on a shaft 103 driven by any suitable means not shown. The conveyer bands 101 are here indicated as flat belts, tho they may be chains, and they are of any desired length to pass over suitable tail pulleys at the far end not shown. Also these conveyer bands are preferably slidably supported as by guides 104 to better carry the weight of the lumber bundles B.

Conveyer 101 terminates in spaced relation to the sawing machine, and bridging the space is a relatively short chain conveyer comprising a spaced series of endless chains 105 passing over sprockets 106, 107 respectively supported on shafts 108, 109, the latter being driven by a chain 110 from shaft 27 of the sawing machine as by sprockets 111 and 112.

Shaft 108 is spaced to the left of shaft 103 so that conveyers 101 and 105 will be in overlapping relation and so that the bundles of lumber coming along in direction of the arrows on conveyer 101 may be transferred from conveyer 101 to conveyer 105, but means is provided to control such a transfer which comprises a pair of shafts 113, 113' extending parallel with shafts 103 and 108 but to the left of the latter and which shafts each carry a series of stop arms 114, 114' extending laterally to the right, and which arms may be alternately rocked (with their shafts) from a position substantially parallel with and below the upper plane of conveyer 101, to an angularly raised position extending above the plane of the conveyer as shown respectively for arms 114' and 114, by means of a piston rod 115 of a double acting air cylinder 116 operatively connected to a rocker arm 117 linked at opposite ends respectively by rods 118, 118' to arms 114, 114'.

The air cylinder is pivotally connected as at 119 to its base plate 120 to compensate for arcuate motion of the rocker arm, and is connected to a common so-called four-way air control valve 123 positioned under the sawing machine and which valve has an operating lever 124 linked as at 125 to a tripping lever 126 pivotally mounted as at 127 to the frame of the sawing machine in position so that the upper end 127' of the tripping lever will be tripped by each of the chain lugs 22 of the traveling chains 23 of the machine and will at once return upon passing of the lug by the action of a return spring 128.

Compressed air is supplied from any suitable source to the valve 123 and normally (with the valve lever 124 in un-tripped position as shown in the drawing) the pressure is at the right-hand or underside of the air cylinder piston 129 and arms 114 are thereby lifted at an angle to intercept the oncoming bundle of lumber and support it above conveyer chains, which are preferably just a trifle higher than belts 101.

When the control valve lever 124 is tripped by the passing of a lug 22 it switches the air pressure from hose 121 to hose 122 while exhausting the former to atmosphere in the well-known way of air control valves, and thus forces the piston 129 back, to lower the arms 114 and deposit the lumber bundle upon chains 105 which carry it to the sawing machine guides 21', while at the same time arms 114' rise above the conveyer. The speed of chains 105 is so determined by their direct gearing to the machine chains 23 through the common driving shaft 27 that by the time the lug 22 which tripped the valve comes up around sprocket 24, the bundle from arms 114 is in advance of the lug as indicated in Fig. 2 in dotted lines at B, in position ready to be engaged and carried under suitable hold-down bars 132 and past the saws.

The moment the bundle has been deposited from arms 114 to chains 105, the other set of arms 114' have risen up to intercept the next bundle (if one is close at hand) or lift a bundle which may already be upon it, to prevent the possibility of two bundles being passed to the saw. As soon as the leaving bundle has cleared arms 114 they rise again as spring 128 returns the tripped air valve 123 to position shown in the drawing, and arms 114' are lowered again to thereby transfer their bundle (if any) from arms 114' to arms 114, or if not arms 114 being slanted above the conveyer will intercept the next bundle of lumber coming along. The extreme ends of the arms are preferably turned up a trifle to form aligning stops 133 as indicated in the drawing. The bundles are made up at a remote point and placed on conveyer 101 roughly spaced as to sawing machine requirements and may or may not be extending at right angles across the conveyer, but as each one starts to ride up the inclined stop arms it automatically is swung into correct position so as to insure the lugs 22 of the several chains of the sawing machine all coming up behind it after the bundle has been transferred to the machine by the intermediate feeder conveyer 105.

It is of course understood that the conveyers 101 and 105 are of a total breadth to handle the longest lumber desired to be trimmed, or in other words, about equal to the total length of the sawing machine which they are used to feed, and also that the various shafts are suitably supported in bearings 130 in turn supported on suitable framework 131.

Having thus described my improved lumber feeder for sawing machines it will be evident to those skilled in the art that in place of air operated cylinder 116 hydraulic operation may be resorted to, also that numerous other details may be changed within the scope of the invention, and I therefore claim:

1. In a lumber feeder of the character described, a multiple strand conveyer across the strands of which the lumber extends, a purality of supporting arms beneath the conveyer, and means pivotally mounting said arms for slanted projection upward between the conveyer strands so as to force the lumber to ride up on said arms and stop while the cenveyer continues to travel beneath the lumber, and timed means for lowering said arms to permit said bundle to continue its travel, said arms provided with a definite stop carried by the arms at their outer ends to limit the movement of the lumber up on said arms, and which stop is lowered with the arms below the level of the conveyer when the arms are lowered.

2. In a lumber feeder of the character described, a multiple strand conveyer across the strands of which the lumber extends, a plurality of supporting arms beneath the conveyer, and means pivotally mounting said arms for slanted projection upward between the conveyer strands so as to force the lumber to ride up on said arms and stop while the conveyer continues to travel beneath the lumber, and timed means for lowering said arms to permit said bundle to continue its travel, their being two sets of said supporting arms, one set following the other set in direction of travel of the lumber, and actuating means for the two sets of arms so arranged as to lower one set of arms and raise the other set and vice versa.

3. In a lumber feeder of the character described, a multiple strand first conveyer across the strands of which the lumber extends, a plurality of supporting arms beneath the conveyer, and means pivotally mounting said arms for slanted projection upward between the conveyer strands so as to force the lumber to ride up on said arms and stop while the conveyer continues to travel beneath the lumber, and timed means for lowering said arms to permit said bundle to continue its travel, and a second multiple strand conveyer in overlapping end relation with the first conveyer which receives the bundle when the arms are lowered for carrying it to a machine to be fed, said machine having a multiple strand feed conveyer in overlapping end relation with the second conveyer provided with a lumber engaging lug projecting therefrom for carrying lumber to said machine, compressed air operated means for raising and lowering said arms, a trip operated remote control air valve mounted on said machine for controlling said air operated means, said lug arranged to operate said trip as it moves along to lower said arms so that the lumber will be advanced to the machine in timed relation to be engaged by said lug.

4. In a lumber feeder of the character described, a multiple strand first conveyer across the strands of which the lumber extends, a plurality of supporting arms beneath the conveyer, and means pivotally mounting said arms for slanted projection upward between the conveyer strands so as to force the lumber to ride up on said arms and stop while the conveyer continues to travel beneath the lumber, and timed means for lowering said arms to permit said bundle to continue its travel, and a second multiple strand conveyer in overlapping end relation with the first conveyer which receives the bundle when the arms are lowered for carrying it to a machine to be fed, said machine having a multiple strand feed conveyer in overlapping end relation with the second conveyer provided with a plurality of spaced lumber engaging lugs projecting therefrom for carrying lumber to said machine, compressed air operated means for raising and lowering said arms, a trip operated remote control air valve mounted on said machine for controlling said air operated means, said lugs arranged to successively operate said trip as they move along to lower said arms so that the lumber will be advanced to the machine in timed relation to be engaged by the tripping lug, and means automatically reversing said valve upon passing of a tripping lug.

ELMER C. MEAD.